No. 617,332. Patented Jan. 10, 1899.
J. L. GLAZIER.
MOTOR VEHICLE.
(Application filed Aug. 30, 1897.)

(No Model.) 5 Sheets—Sheet 2.

Witnesses
Inventor
John L. Glazier
By his Attorneys,

No. 617,332. Patented Jan. 10, 1899.
J. L. GLAZIER.
MOTOR VEHICLE.
(Application filed Aug. 30, 1897.)
(No Model.) 5 Sheets—Sheet 4.

Inventor
John L. Glazier

Witnesses
By W O S Attorneys,

UNITED STATES PATENT OFFICE.

JOHN L. GLAZIER, OF SAVANNAH, MISSOURI.

MOTOR-VEHICLE.

SPECIFICATION forming part of Letters Patent No. 617,332, dated January 10, 1899.

Application filed August 30, 1897. Serial No. 650,009. (No model.)

*To all whom it may concern:*

Be it known that I, JOHN L. GLAZIER, a citizen of the United States, residing at Savannah, in the county of Andrew and State of Missouri, have invented a new and useful Motor-Propelled Vehicle, of which the following is a specification.

My invention relates to motor-propelled vehicles or motocycles, and has for its object to provide an improved mechanism for transmitting motion from a motor carried by a vehicle to the driving-wheels of the latter and to provide simple and efficient means for controlling the speed and direction of movement, whether forward, backward, or lateral, and for controlling the braking devices.

Further objects and advantages of this invention will appear in the following description, and the novel features thereof will be particularly pointed out in the appended claims.

In the drawings, Fig. 4$^a$ is a detail view of the roller-bearing which I prefer to employ in connection with the steering-wheel spindle.

Similar numerals of reference indicate corresponding parts in all the figures of the drawings.

The framework of the vehicle embodying my invention consists, essentially, of parallel reaches 1, connected at their ends to a rear beam 2 and at their front ends to a bolster 3, which forms the support for the front end of the forward or resilient vehicle-body section. The reaches 1 are connected transversely at an intermediate point by a front beam 4, which is extended terminally beyond the reaches, as is the rear beam 2, to support side beams 5, the front ends of these beams being deflected inwardly and attached to the reaches in front of the front beam 4. In the construction illustrated the front extremities of the reaches consist of metallic bars 1$^a$, which form the connection between the reaches proper and the bolster 3. The main beams of the frame are also connected at intermediate points by suitable braces, such as the intermediate transverse brace 6, connecting the reaches between the front and rear beams, and a diagonal brace 7, connecting one of the reaches near the front beam 4 with the center of the transverse brace 6.

Figures 2, 4, 12:
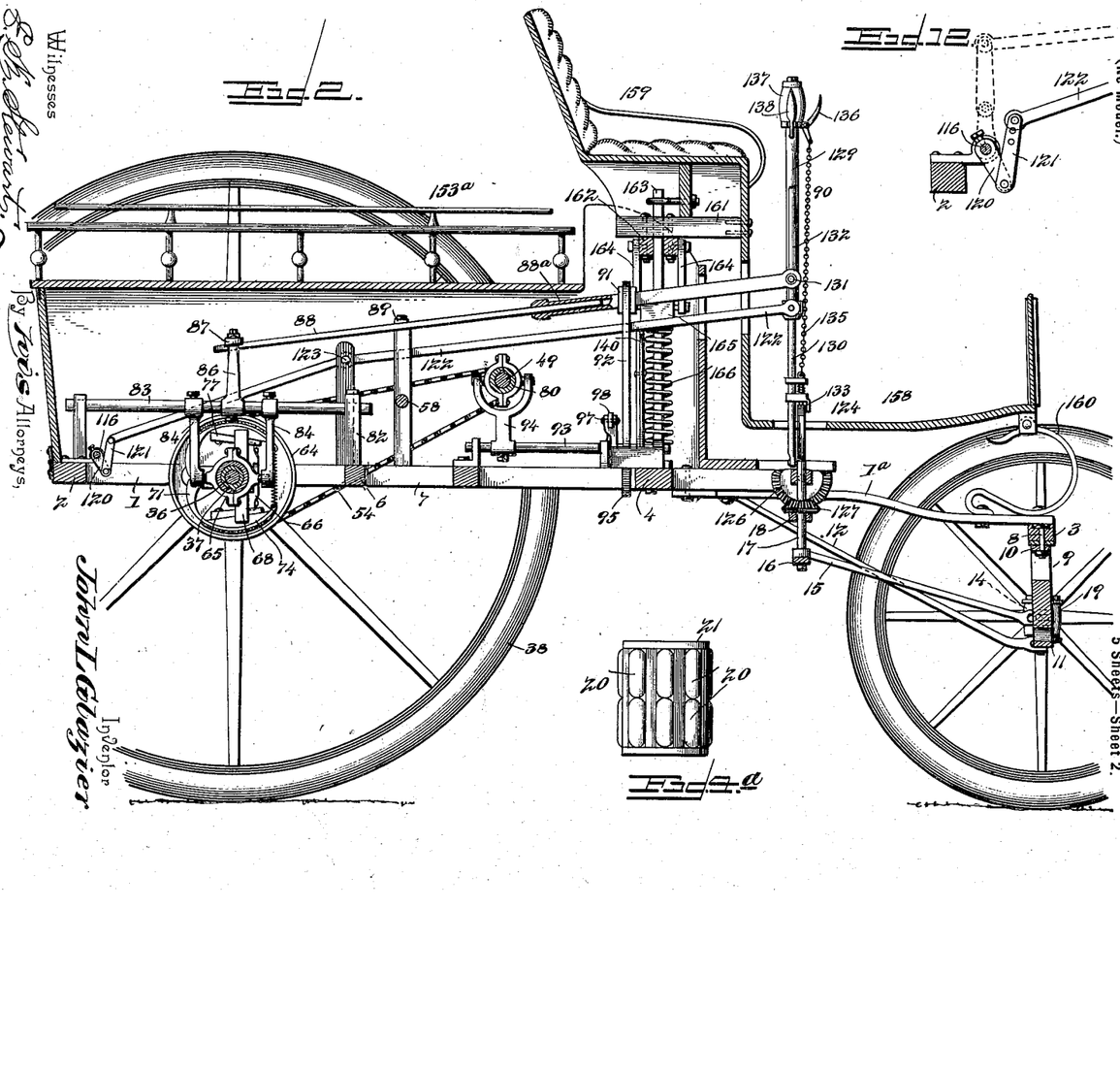
Fig. 2 is a longitudinal sectional view of the complete vehicle on a plane indicated by the line 2 2 of Fig. 1.
Fig. 4 is a detail sectional view of one of the bearings by which the steering-wheel spindles are mounted for swinging movement.
Fig. 12 is a detail view of the connection between the brake-rod and the rockshaft by which motion is communicated to the brake and backing mechanism.

Centrally mounted, as by a king-bolt 8, upon the bolster 3 is the front axle 9, preferably of skeleton construction, with its extremities bifurcated to form upper and lower parallel arms 10 and 11, and this front axle is braced upon opposite sides of its center by means of rods 12, which extend rearwardly and upwardly to convenient points of the reaches 1. In the bifurcated extremities of the axle are mounted horizontally-swiveled steering-wheel spindles 13, having inwardly-extending arms 14, which are connected by rods 15 with a cross-head 16, which is mounted at its center by means of a vertical spindle 17 upon the framework, a bearing-bracket 18 being employed in this connection, as illustrated clearly in Fig. 15. Each steering-wheel spindle is provided at its inner end with a hub 19, containing a cylindrical cage of bearing-rollers 20, said cage and rollers being shown in detail in Fig. 4$^a$ and having a frame 21, by which the rollers are held in their operative positions. This hub, with its roller-bearing, is mounted upon a spindle 22, which is threaded, as at 23, in a suitable opening in the lower arm 11 of the axle bifurcation, and the upper end of this spindle is reduced, as shown at 24, to fit in an alined opening in the upper arm of the bifurcation, said reduced portion 24 having a still further reduced threaded stem 25, fitted with a lock-nut 26. Each extremity of the spindle is constructed to form a wrench-seat, as shown, respectively, at 27 and 28.

Threaded upon the extremities of the hub 19 are upper and lower sleeves 29 and 30, forming dust-guards and being capable of adjustment to take up lost motion endwise or parallel with the spindle 22. The upper sleeve 29 performs solely the function of a dust-guard to protect a ball-bearing 31, which is interposed between the upper end of the hub and the under surface of the upper arm 10 of the axle bifurcation, said ball-bearing being adapted to receive the downward thrust of the axle due to the weight of the vehicle-body and its contents and communicate the same to the axle-spindle. The lower guard or sleeve 30 extends inwardly beneath the frame of the roller-bearing 20, from which it is separated by a ball-bearing 32, said sleeve 30 thus performing the function of a bearing-cap and being itself supported out of contact with the lower arm 11 of the bifurcation by means of a ball-bearing 33, packing 34 and 35 being arranged, respectively, within the sleeve 29, around the ball-bearing 31, and beneath the bearing-cap 30 and within the ball-bearing 33.

Mounted in suitable bearings on the framework is a driving-wheel spindle 36, fitted between its bearings with a loose sleeve 37. The driving-wheels 38 are fixed to the outer extremities of the driving-spindle by means of collars 39, locked by set-screws 40 or otherwise to the spindle and provided with outwardly-extending spurs 41, which engage corresponding sockets in the inner ends of the driving-wheel hubs. It will be understood that the driving-spindle bearings are provided with antifriction devices, such as roller-bearings 42, corresponding in general construction with that illustrated in detail in Fig. 4$^a$.

Figures 3, 4, 5, 20:
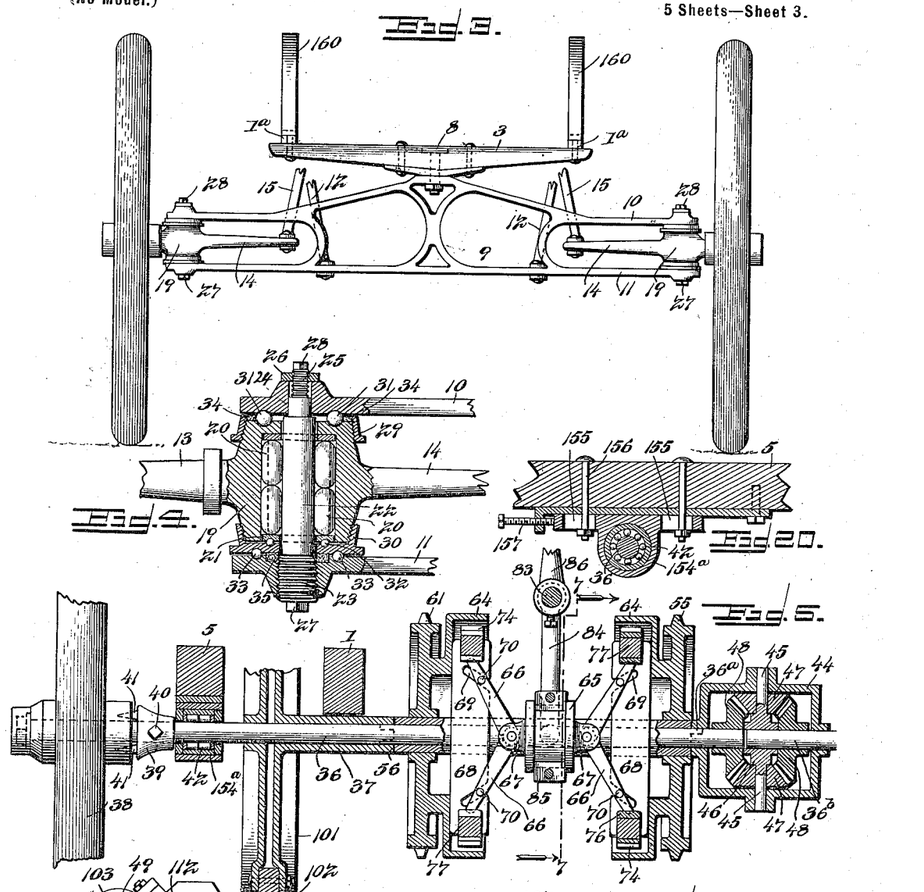
Fig. 3 is a front view of the running-gear to show the means whereby the front or steering wheels are mounted.
Fig. 5 is a transverse sectional view taken in the plane of the driving-wheel spindle on the plane indicated by the line 5 5 of Fig. 1.
Fig. 20 is a detail view of an adjusting device for the driving-spindle, whereby the tension of the driving-chains may be varied.

The driving-spindle is constructed of separate members 36$^a$ and 36$^b$, having abutting extremities, as also shown in Fig. 5, to provide for a differential connection therebetween. Carried by the sleeve 37 is a differential gear-casing 44, having transversely-disposed stub-spindles 45, which radiate from a collar 46, loosely fitted upon the member 36$^b$ of the driving-spindle. Upon each of these stub-spindles 45 is loosely mounted a bevel-gear 47, and to each member of the driving-spindle is fixed a bevel-pinion 48, the pinions 47 being arranged to mesh with the pinions 48, as in the ordinary construction of differential gearing. The object of this gearing in the present construction, as will be obvious, is to provide for the more rapid rotation of that member of the driving-spindle which carries the driving-wheel at the outer side of a curve which is being described by the vehicle. In other words, the object of said gearing is to provide for a differential speed of rotation between the driving-wheels when the vehicle is traversing a curved path.

Figure 1:
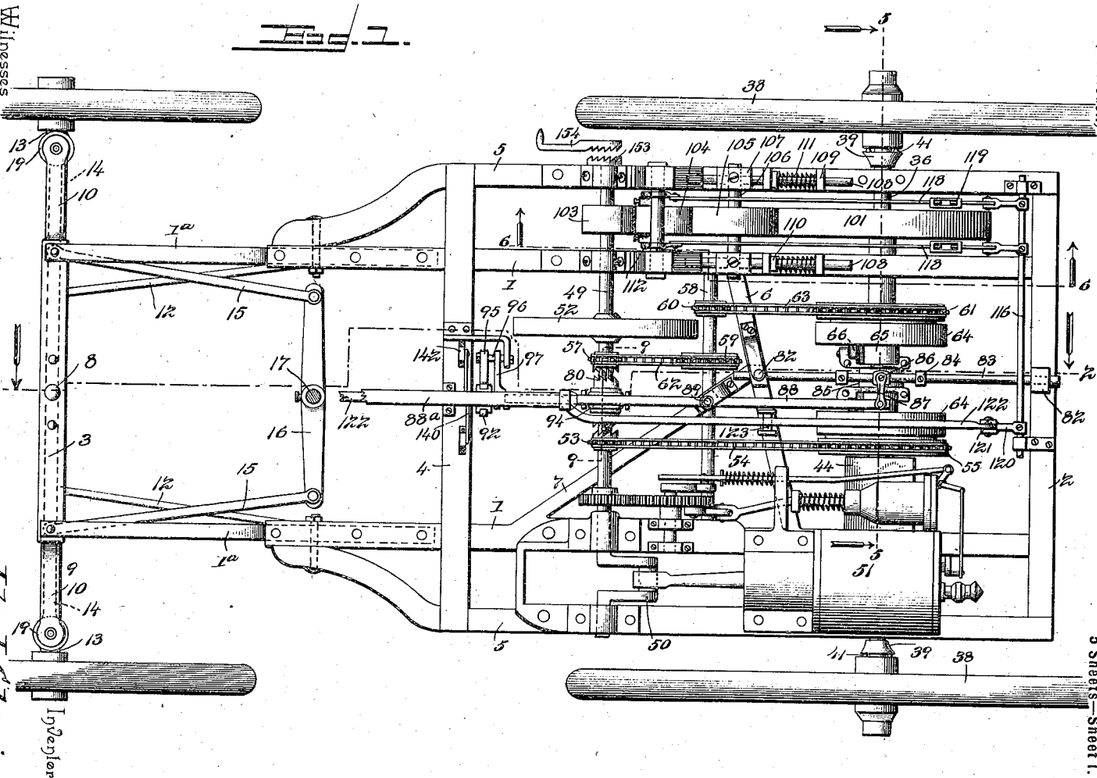
Figure 1 is a plan view of the running-gear of a vehicle provided with propelling mechanism constructed in accordance with my invention.

Mounted transversely on the framework, preferably in advance of the driving-spindle, is a main shaft 49, having a crank 50, whereby motion may be communicated thereto from a motor, which is indicated in diagram at 51 in Fig. 1. This main shaft also preferably carries a fly or balance-wheel 52 or its equivalent.

A plurality of systems of connection between the main shaft and the driving-spindle may be employed to secure different speeds of rotation of the spindle with a continuous uniform speed of rotation of the main shaft; but I have deemed it sufficient to illustrate in the drawings only two different systems of connection as illustrating the principle of my invention. A transmitting chain-wheel 53 on the main shaft is connected by means of a chain 54 with a receiving chain-wheel 55, loosely fitted upon the sleeve 37, the latter for convenience of manufacture being preferably of sectional construction, with the contiguous ends of adjoining sections provided with interlocking tongues, as indicated at 56 in Fig. 5. The other system of connections between the main shaft and the driving-spindle includes a transmitting chain-wheel 57, an intermediate spindle 58, carrying reducing-gears 59 and 60, a receiving chain-wheel 61, and chains 62 and 63 for connecting said gears.

Each of the receiving-gears or chain-wheels 55 and 61 carries a clutch-ring 64, forming one member of a driving-spindle clutch mechanism, whereby either receiving-gear may be locked to the driving-spindle sleeve. The clutch-rings 64 are arranged in relatively reversed positions with their open sides facing each other, and interposed therebetween is a sliding collar 65, carrying the other members of the clutch devices for respective coöperation with the clutch-ring. In the construction illustrated the movable collar 65, which is preferably feathered upon the sleeve, carries the pivotal inner extremities of clutch-arms 66, said collar being provided with ears 67, upon which said clutch-arms are pivoted. Spanning each clutch ring or rim is a guide-bar 68, provided with inclined or cam slots 69, in which operate guide-pins 70, arranged near the outer extremities of the clutch-arms. The outer extremities of the clutch-arms are arranged in operative relation with clutch-shoes 71, preferably of segmental construction, and being pivotally mounted, as at 72, upon a lateral projection 73 of the guide-bar 68. Said shoes are adapted to engage frictionally with the inner surface of the clutch-rim, and in order to increase the frictional resistance offered thereby said shoes are preferably provided with friction-faces 74 of any suitable yielding material. The clutch-shoes are yieldingly held out of contact with the clutch-rim by means of a retracting-spring 75, and in order to provide for the relative adjustment of the parts to insure the operative set of the clutch-shoes in contact with the clutch-rim when the collar 65 is moved through a given distance I preferably arrange adjustable bearing-wedges 76 in contact with the inclined surfaces of blocks 77, secured, respectively, to the clutch-shoes, said bearing-wedges being interposed between the extremities of the clutch-arms 66 and the clutch-shoes and being adapted by longitudinal adjustment to take up lost motion or wear between the clutch-arms and the shoes. The bearing-wedges may be secured in their adjusted positions by any suitable means, such as set-screws 78, extending through slots 79.

From the above description it will be seen that by the movement of the collar 65 in one direction the clutch at one side of the plane thereof will be operated to lock one of the receiving-gears to the sleeve 37, whereas a corresponding linear movement of the collar in the opposite direction will cause the operation of the other clutch mechanism and the corresponding locking of the other receiving-gear to the sleeve. I have found it desirable, however, not only to employ clutch mechanism for locking either of the receiving-gears to the driving-spindle sleeve, said clutch mechanism being adapted to occupy an intermediate position whereby the sleeve is released from both receiving-gears, but also to provide means whereby either or both transmitting-gears 53 and 57 may be disengaged from the main shaft, whereby when the vehicle is at rest the operation of the motor may continue without actuating any other portion of the mechanism than the main shaft. Hence in the drawings I have illustrated a main-shaft clutch mechanism (in addition to the driving spindle clutch mechanism above described) wherein a sliding collar 80 is provided with terminal serrated or toothed clutch-faces 81 for engagement with corresponding clutch-faces $53^a$ and $57^a$ on the hubs of the transmitting-gears, said collar being feathered upon the main shaft.

Arranged longitudinally in suitable bearings 82 on the rear beam 2 and the cross-brace 6 is a rock-shaft 83, carrying a rocker having a downwardly-extending arm 84, terminating in a ring 85, which is fitted in the channel of the collar 65, the upper arm 86 of said rocker being connected by means of a link 87 with the rear end of a clutch-shifting lever 88, fulcrumed for lateral swinging movement by means of a pivot-pin 89 on the brace-bar 7. It it desirable that this clutch-shifting lever should be longitudinally extensible, and hence I preferably construct it of telescoping sections, of which the exterior or sleeve section $88^a$ receives the contiguous end of the inner or main section and is pivotally connected at its front end to an operating-lever 90. This clutch-shifting lever, preferably the tubular member $88^a$ thereof, extends through a guide-opening in a guide-block 91, which is mounted to slide in the bifurcated upper extremity of a rocker 92, fulcrumed upon a spindle 93, which is disposed longitudinally of the framework and carries a yoke-arm 94, engaged with the collar 80 of the main-shaft clutch mechanism. The rocker 92 is provided with a lateral arm 95, having a cam-slot in which operates a pin 96 on the end of a link 97, connected to an arm 98 on the spindle 93. Terminal portions 99 and $99^a$ of the cam-slot are concentric with the fulcrum of the rocker 92; but the intermediate or connecting portion $99^b$ of said slot is deflected from a concentric position to cause the outward or inward movement of the guide-pin 96, according to the direction of movement of the rocker. It is obvious that when the rocker is moved the guide-pin will be shifted either outwardly or inwardly until the contiguous concentric portion of the slot comes into engagement therewith, when the guide-pin will be retained in that position throughout the movement of the rocker in the same direction. The advantage of this construction will be explained hereinafter. The guide-pin is mounted for reciprocatory movement in a guide-slot 100, supported by the cross-beam 4 of the framework.

Figures 7, 8, 9, 10, 11, 13:
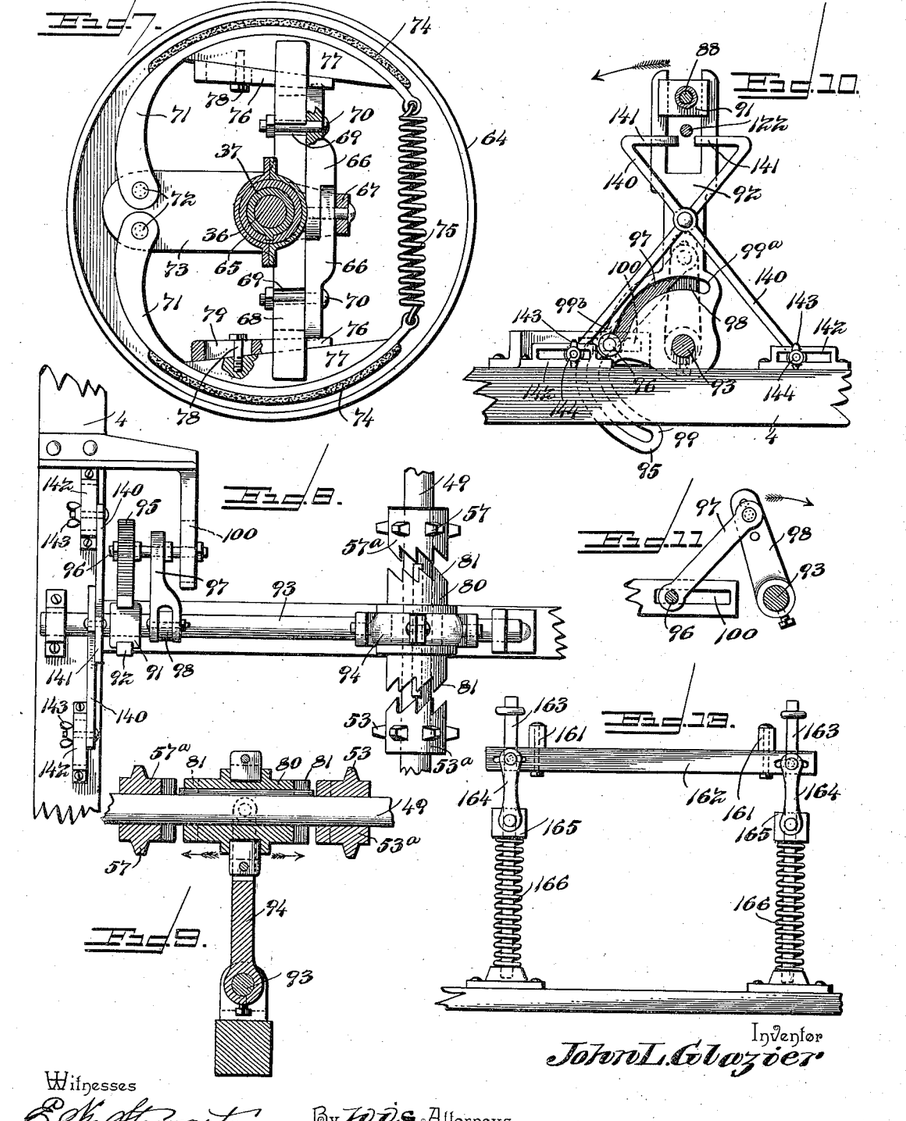
Fig. 7 is a detail face view of one of the driving-spindle clutches, the contiguous portion of the mechanism being shown in section upon a plane indicated by the line 7 7 of Fig. 5.
Fig. 8 is a plan view of the main-shaft clutch mechanism, including means for operating the same.
Fig. 9 is a detail vertical section of the main-shaft clutch mechanism on the plane indicated by line 9 9 of Fig. 1.
Fig. 10 is a front view of the means for actuating the main-shaft clutches, and also showing the guards for controlling the movement of the brake-rod.
Fig. 11 is a detail view of the connection between the main-shaft-clutch-operating spindle and the pin by which motion is communicated thereto.
Fig. 13 is a detail view showing the means for mounting the yielding forward section of the vehiclebody.

As hereinbefore explained, either of the driving-spindle clutch devices may be actuated to lock one of the receiving-gears 61 64 to the driving-spindle, according to the direction of movement of the collar 65, and that the oscillatory movement of the clutch-shifting lever 88 is adapted to accomplish this movement of the clutch-collar; but it will be seen, furthermore, that said oscillatory movement of the clutch-shifting lever will cause the swinging movement of the rocker 92, and hence the shifting of the guide-pin 96 and the rocking of the spindle 93 to throw the clutch-collar 80 into engagement with one of the transmitting-gears 53 57. When the clutch-shifting lever is moved in the direction to lock the receiving-gear 55 to the driving-spindle, as by a movement to the right of the front end of said shifting-lever, the rocker 92 will be moved in the direction indicated by the arrow in Fig. 10, or toward the right, and consequently the guide-pin 96 will be moved inward or in the opposite direction toward the spindle 93. This movement of the guide-pin will cause the arm 98 to swing in the direction indicated by the arrow in Fig. 11, and hence the clutch-collar 80 will be moved into engagement with the transmitting-gear 53. Thus by a single movement of the clutch-shifting lever both the main shaft and the driving-spindle clutch mechanism may be operated to throw either system of connections into or out of operation.

Figure 6:
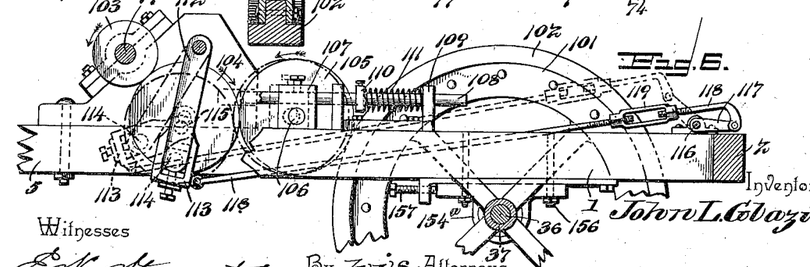
Fig. 6 is a detail longitudinal section to show the brake and backing mechanism on the line 6 6 of Fig. 1.

In addition to the above-described construction I also preferably employ a combined brake and backing mechanism, as I have found in practice that a single mechanism may be made to perform both functions, and, referring to Figs. 1, 5, and 6, it will be seen that attached to the sleeve 37 of the driving-spindle is a friction-wheel 101, preferably provided with a peripheral friction-rim 102, (see Fig. 5,) and fixed to the main shaft 49 is a friction-pulley 103, adapted to be actuated directly by the main shaft, and interposed between the driving friction-pulley 103 and the driven friction-wheel 101 are transmitting friction-pulleys 104 and 105. The transmitting-pulley 105 has its spindle 106 mounted in sliding bearing-blocks 107, mounted in suitable guides upon the framework. In the construction illustrated the bearing-blocks 107 are provided with guide-stems 108, fitted to slide in suitable guides 109, and coiled upon the stems and bearing against adjustable collars 110 thereon are return-springs 111, whereby the transmitting-pulley 105 is yieldingly held repressed and out of peripheral contact with the driven pulley 101. In order to communicate motion from the driving-pulley 103, which is preferably of small diameter, to the transmitting-pulley 105, I employ the adjustable controlling-pulley 104, which is so mounted as to adapt it to be crowded between the peripheries of said driving and transmitting pulleys, as indicated by the full lines in Fig. 6, and thus force the periphery of the transmitting-pulley 105 into peripheral contact with the driven pulley 101. The means illustrated in the drawings for mounting the controlling-pulley 104 consist of swinging arms 112, fulcrumed at their upper ends upon a suitable fixed portion of the framework and carrying a tilting bearing 113, fulcrumed, as at 114, upon the arms 112, and carrying a spindle 115 of the controlling-pulley. When the parts are in the inoperative position illustrated in dotted lines in Fig. 6, with the swinging arms in a forwardly and downwardly inclined position, the transmitting-pulley 105 is held out of peripheral contact with the driven pulley by means of the springs 111; but the forward swinging movement of the free ends of the arms 112 to the position indicated in full lines in said Fig. 6 causes the controlling-pulley 104 to be crowded upwardly between the peripheries of the driving-pulley 103 and the transmitting-pulley 105, and consequently the forward movement of said transmitting-pulley into contact with the driven pulley, the controlling-pulley forming the connection between the driving-pulley and the transmitting-pulley. Upon relieving the strain by which the swinging arms 112 are held in their rearwardly-adjusted position, the tension of the return-springs 111 will cause the return of the parts to their normal positions, as indicated in dotted lines in said figure. It is obvious that when the vehicle is progressing forwardly the disconnection of the driving-spindle from the main shaft by the return of the clutch-collars to their intermediate or inoperative positions and the actuation of the swinging arms 112 to bring the friction-pulleys into operative relation will produce a frictional braking action upon the sleeve of the driving-spindle, the extent of the resistance being proportionate to the force with which the controlling-pulley is crowded between the driving-pulley and the transmitting-pulley, and hence the amount of pressure applied through the transmitting-pulley to the periphery of the driven pulley, and the effect of this braking device is produced not only by offering a frictional obstacle to the forward rotation of the driving-spindle, but by an opposing or reverse rotation of the transmitting-pulley. When the vehicle is at rest, the movement of the friction-pulleys into operative contact will cause a reverse motion to be communicated to the driven pulley 101, and hence backward movement will be imparted to the vehicle.

In the construction illustrated the means employed for actuating the backing and brake mechanism includes a rock-shaft 116, mounted transversely in suitable bearings contiguous to the rear beam 2 and provided with arms 117, connected by rods 118 with the tilting beam 113, said connecting-rods being provided with tension devices consisting of turnbuckles 119 or the equivalents thereof. The rock-shaft 116 is also provided with an arm 120, to which by means of an interposed link 121 is connected the rear end of a backing and brake lever 122, fulcrumed for vertical swinging movement upon an intermediate pivot 123. This brake-operating lever is arranged at its front end below the plane of the clutch-shifting lever and is also connected to the operating-lever 90.

Pivotally mounted upon the frame contiguous to its front end is a steering-arm 124, fulcrumed at 125 and carrying a toothed segment or gear 126, meshing with a mutilated gear 127 on the spindle 17. This steering-arm forms one member of the operating-lever 90, the body portion of the latter being pivotally mounted, as at 128, on the arm 124 for swinging movement at right angles to the plane of oscillation of the steering-arm for lateral swinging movement, (the movement of the steering-arm necessary to operate the cross-head 16 to steer the vehicle being forward and rearward.) In the construction illustrated in the drawings the body portion of the operating-lever consists of telescoping upper and lower or outer and inner sections 129 and 130, both sections being tubular and the lower or inner section being that which has pivotal connection at 128 with the steering-arm 124. The front end of the clutch-shifting lever 88 is bifurcated and is pivotally connected to the lower or pivotal member 130 of the operating-lever by means of a transverse pin 131, and the upper member 129, which is mounted to slide upon the lower member 130, is slotted, as at 132, to straddle the pivot 131, whereby said upper member is adapted for sliding movement without affecting the point of connection of the clutch-shifting lever with the operating-lever. Inasmuch as the clutch-shifting lever is moved laterally to set or disengage the clutch-members it will be seen that the pivotal movement of the lower member 130 of the operating-lever about its axis 128 will enable the operator to manipulate the clutches without affecting the operation of steering, particularly in view of the fact that a locking device is employed to secure the body portion of the operating-lever or the pivotel member of said body portion in the desired position with relation to the steering-arm 124. In the construction illustrated this locking device consists of a segment 133, engaged by a bolt or pawl 134, having a suitable actuating-spring. When the pivotal member of the operating-lever is in alinement with the steering-arm 124, the clutch members will occupy an intermediate position, whereby forward motion will not be communicated to the vehicle; but by swinging the pivotal member 130 in either direction from said intermediate or central position the desired receiving-gear of the driving mechanism may be locked to the sleeve of the driving-spindle, such swinging movement of the pivotal member being possible after disengaging the bolt 134 from the segment 133 and the pivotal member being locked with either of said receiving-gears in operative engagement when the bolt 134 is released to reengage the segment 133. In the construction illustrated the locking-bolt 134 is connected by means of a chain 135 or its equivalent to a hand-lever 136, fulcrumed upon the operating-lever contiguous to the grip 137 thereof, said grip being carried by the upper or exterior member 129 of the operating-lever.

From the above description it will be seen that by the forward and rearward swinging movement of the operating-lever the cross-head 16 may be swung in either direction to turn the steering-wheels of the vehicle, and thus control the direction of movement thereof, and that the lateral swinging movement of the operating-lever serves to actuate the clutch-shifting lever to throw either the high or low speed system of connections or gearing into operative position for transmitting motion from the main shaft to the driving-spindle, and in addition to these functions of the operating-lever I have deemed it desirable to provide for actuating the brake and backing lever 122, whereby the operator can control the direction of movement whether to the right or to the left, the engagement and disengagement of the clutches upon which depends the forward movement of the vehicle, the speed of such forward movement, the application of a brake, or the backing of the vehicle by the manipulation of a single lever without removing his hand from the grip thereof. In order to accomplish this, the upper member 129 of the operating-lever is fitted to slide upon the lower member and is connected with the front bifurcated extremity of the brake and backing lever 122, said upper member being normally held in its elevated position by means of a locking device consisting, in the construction illustrated, of a pivotal locking-lever 138, having its nose arranged to engage a suitable opening 139 in the lower member 130, which may for convenience be termed the "stem" of the operating-lever. This locking-lever 138 is yieldingly held in its engaging position by means of an actuating-spring and is adapted to be disengaged from the tubular stem or lower member 130 of the operating-lever to release the upper sliding member or sleeve 129 for depression to lower the front end of the brake and backing lever 122, and thus apply the brake in the manner hereinbefore explained.

It is desirable, as will be readily understood by those skilled in the art, to provide means for preventing the accidental depression of the front end of the brake and backing lever 122 and even to prevent the operation of said lever by the manipulation of the means provided for that purpose unless the clutch-shifting lever is in such a position as to arrange the movable clutch members in their intermediate or disengaged positions. Hence contiguous to the rocker 92 and coöperating therewith I employ a safety device consisting of pivotally-connected oppositely-disposed guard-rods 140, having inturned upper extremities 141, which occupy a position below that of the brake-lever 122 and with the contiguous extremities of said inturned portions spaced apart a sufficient distance to allow said lever to pass therebetween when the rocker is in a truly vertical position, and hence when the clutch-shifting lever is in its intermediate or inoperative position. The lower extremities of the guard-rods 140 are secured in the desired positions to insure the desired interval between the extremities of the arms 141 by means of locking devices consisting of studs arranged in slotted brackets 142 and engaged by thumb-nuts 143. By varying the positions of these studs 144 in the slots 142 the opening between the contiguous extremities of the arms 141 may be arranged at any desired point.

Figures 14, 15, 16, 17, 18, 19:
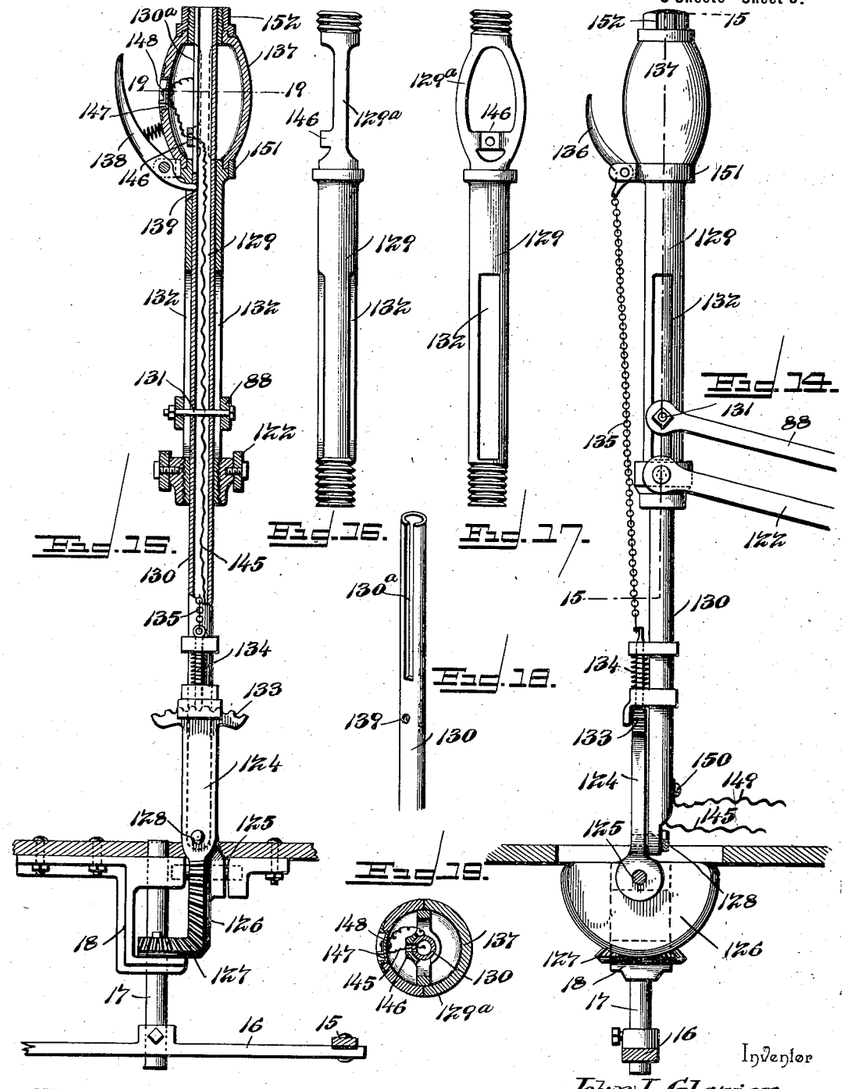
Fig. 14 is a detail rear view of the operating-lever.
Fig. 15 is a side view of the same, partly in section, on the plane indicated by the line 15 15 of Fig. 14.
Fig. 16 is a detail side view of the upper or adjustable operating-lever section detached.
Fig. 17 is a detail front view of the same.
Fig. 18 is a detail view of a portion of the inner or lower operating-lever section detached.
Fig. 19 is a detail transverse section of the operating-lever grip on the line 19 19 of Fig. 15.

Various means may be employed for stopping and starting the motor, according to the construction of the latter; but as it is frequently desirable to employ an electrical agency in this connection I have constructed the operating-lever with a tubular stem 130, through which one terminal of an electrical conductor 145 is adapted to pass, the wire entering the stem at its lower end, as shown clearly in Fig. 14, thence extending in a loose or semicoiled condition to a point near the upper end of the stem and passing laterally through a keeper 146 for attachment to one member, 147, of a switch. The other member, 148, of the switch is connected with the other terminal 149 of the conductor through the hollow stem 130, to which said terminal is connected by means of a binding-screw 150. In order to provide for this arrangement of the electrical conductor, I preferably form the grip 137 of hollow or shell construction and in half-sections, (indicated in Fig. 19,) the sections being provided with a reduced lower end engaged by a band 151, which encircles the upper end of the slidable sleeve 129, and provided at their upper extremities with a corresponding reduction engaged by a cap-nut 152, threaded upon the upper extremity of said sleeve. It is obvious that the movable member of the switch may be turned by the operator to throw the engine either in or out of operation without removing the hand from the grip. The upper end of the stem 130 is slotted, as shown at 130$^a$, to allow the conductor 145 to pass through into the guide 146, the latter being formed, as shown in Fig. 17, on the skeleton frame 129$^a$ of the slidable shell 129. In case it is necessary to manually start the engine I have devised a detachable crank-arm 153, provided with a toothed hub for engagement with a toothed collar 154 on the extremity of the main shaft, as clearly shown in Fig. 1, the lever in this figure being shown detached.

In order to provide for the positive transmission of motion from the motor through the mechanism to the driving-spindle, I have found it desirable to support the operating mechanism upon a fixed frame, as hereinbefore described, said frame forming the running-gear of the vehicle and also supporting the rear member 153$^a$ of the vehicle-body, said body forming a casing in which the operating mechanism is housed, as will be seen by reference to Fig. 2, and in order to provide for varying the tension of the chains which communicate motion to the driving-spindle I preferably mount said spindle in adjustable bearings 154$^a$, slidably mounted upon the frame, as upon the side bars 5, and slotted, as shown at 155, (see Fig. 20,) for the reception of fastening devices, such as bolts 156. In order to secure the desired adjustment of these bearings, I employ tension-screws 157.

The front member 158 of the vehicle-body, upon which the driver's seat 159 is arranged, is preferably spring-supported, and it is obvious that spring-supported seats or an additional spring-supported section containing seats for passengers may be mounted upon the rear section 153$^a$. The construction of front vehicle-body member which I prefer to employ in this connection is clearly shown in Fig. 2, wherein the front or dashboard end is mounted by means of C-springs 160 upon the front ends or extensions of the reaches 1 and above the bolster 3, while rearwardly-extending bars 161, beneath the seat 159, rest upon a transverse yieldingly-supported cushion-bar 162, terminally slotted to receive vertical guide-rods 163 and connected by pivotal links 164 to vertically-movable follower-blocks 165, also mounted upon said guide-rods. The guide-rods are permanently secured at their upper and lower ends to the framework, and coiled thereon to support the follower-blocks 165 are springs 166. The slots in the extremities of the cushion-bar 162 are of such a length as to allow a slight endwise swinging movement of said bar, this endwise movement being allowed by the pivotal or swinging movement of the links 164. This construction and arrangement of parts I have found to be particularly advantageous from the fact that it allows both vertical and a slight lateral yielding movement of the seat.

The controlling-lever which I have described in connection with my motocycle and with which are connected a plurality of mechanisms for controlling the stopping and starting of the motor, the throwing into and out of gear of the motor with the driving-wheel, the braking of the vehicle, and the steering of the same include a member 129, which is mounted to slide upon the member 130 and which therefore is capable not only of universal swinging movement by reason of its being carried by said member 130, but also of radial reciprocatory movement upon the member 130, and it is by reason of this universal swinging and radial reciprocatory movement of the member 129, in connection with the switch arranged in the grip of the member 129, that I am enabled to efficiently control all of the mechanisms above mentioned by means of a single lever. It will be seen that the radially-movable member 129, owing to the universal mounting of the member 130, is capable of movement in both longitudinal and transverse planes or in planes which intersect each other, and the position of said member 129 in either of its longitudinal or transverse planes does not affect the free movement thereof in the other plane. For instance, the member 129 in either its elevated or depressed position is capable of swinging movement in a longitudinal plane, and at any point of said longitudinal plane said member may be swung laterally or in a transverse plane or a plane intersecting said longitudinal plane. This freedom of movement gives the operator absolute control of the various elements of the apparatus without releasing the grip of the lever.

While in the above description I have set forth a preferred construction and arrangement of parts combining to form an efficient motor-propelled vehicle wherein the operator by the manipulation of a single lever capable of a plurality of movements is able to control the movements and speed with the minimum exertion, it is obvious that various modifications of the described arrangement and that various changes in the form, proportion, and the minor details of construction may be resorted to without departing from the spirit or sacrificing any of the advantages of this invention.

Having described my invention, what I claim is—

1. A motor-propelled vehicle having a running-gear consisting of a supporting-frame, driving and steering wheels mounted on said frame, operating mechanism for the driving-wheels and a steering-lever for the steering-wheels mounted on the frame, and a sectional body having a front spring-supported member vertically movable independently of the steering-lever, and a rear springless member arranged on the supporting-frame to inclose the operating mechanism, substantially as specified.

2. A vehicle having a running-gear comprising continuous longitudinal reaches connected at their front ends by a bolster and at their rear and intermediate points with rear and intermediate beams extending laterally beyond the reaches, longitudinal side bars connecting the extremities of the rear and intermediate cross-beams, a fixed front axle carrying pivotal steering-wheel spindles, and a sectional body having a spring-supported front member and a springless rear member, in combination with steering and driving wheel operating mechanisms, substantially as specified.

3. A vehicle having a running-gear, and a resilient body-section spring-supported at its front end, parallel vertical guide-rods arranged contiguous to the rear end of the body-section, a cushion-bar mounted for vertical movement upon the guide-rods and supporting the rear end of the body-section, spring-supported followers mounted upon the guide-rods, and pivotal links connecting the cushion-bar with the followers, substantially as specified.

4. In a vehicle, the combination with a running-gear, of a spring-supported body-section, parallel guide-rods rising from the running-gear, spring-supported followers mounted upon the guide-rods, a cushion-bar supporting the rear end of the body-section and having slotted extremities fitted upon the guide-rods, the interval between the inner ends of the slots being greater than the interval between the guide-rods to allow endwise movement of the cushion-bar, and pivotal links connecting the cushion-bar with the follower-blocks, substantially as specified.

5. A vehicle having its running-gear provided with a fixed front axle, steering-wheel spindles having hubs mounted upon vertical spindles, and roller-bearings interposed between the spindles and the inner surfaces of the hubs, and having roller-supporting cages mounted upon supporting antifriction-balls, substantially as specified.

6. A vehicle having its running-gear provided with a fixed terminally-bifurcated front axle, steering-wheel spindles having their hubs arranged between the arms of the axle bifurcations, spindles extending axially through the hubs, roller-bearings interposed between the spindles and the inner surfaces of the hubs, said roller-bearings including roller-supporting cages, and ball-bearings interposed between the bearing-roller cages and the lower arms of the front-axle bifurcations, substantially as specified.

7. In a vehicle, the combination with a fixed front axle having terminal bifurcations, of a steering-wheel spindle having its hub arranged between the arms of one of the axle bifurcations, a spindle connecting the arms of said bifurcation and extending axially through the hub, a roller-bearing interposed between the spindle and the inner surface of the hub, and upper and lower ball-bearings interposed between the ends of the hub and the facing surfaces of the arms of the bifurcation, substantially as specified.

8. In a vehicle, the combination with a fixed front axle having terminal bifurcations forming upper and lower arms, of a steering-wheel spindle having a hub arranged in an axially-vertical position between said arms, a spindle extending axially through the hub and terminally attached to the arms, a roller-bearing interposed between the spindle and the inner surface of the hub, caps threaded upon the upper and lower ends of the hub, an upper ball-bearing between the hub and the upper arm, a lower ball-bearing between the lower cap and the lower arm, and a ball-bearing between the lower end of the cage of the roller-bearing and the inner surface of the lower cap, substantially as specified.

9. In a vehicle, the combination with a fixed front axle having terminal bifurcations forming upper and lower arms, of a steering-wheel spindle having a hub arranged in an axially-vertical position between the arms of the contiguous axle bifurcation, a spindle extending axially through said hub, provided at its lower end with a threaded portion engaging an opening in the lower arm and its upper end with a reduced smooth-surfaced portion engaging an opening in the upper arm, a reduced upper terminal extension engaged by a lock-nut, and terminal wrench-seats, a roller-bearing interposed between the spindle and the inner surface of the hub, and a ball-bearing interposed between the upper end of the hub and the upper arm of the axle bifurcation, substantially as specified.

10. In a motor-propelled vehicle, the combination of a driving-wheel spindle, means for communicating rotary motion thereto, fixed collars carried by the spindle and provided with outwardly-extending spurs parallel with the spindle, driving-wheels fitted upon the portions of the spindle beyond said collars and provided at their inner ends with sockets to receive said spurs, and means for holding the wheels with their hubs in engagement with the spurred collars, substantially as specified.

11. In a motor-propelled vehicle, the combination of a main motor-actuated shaft, a driving-wheel spindle, independent operating connections between the main shaft and the driving-spindle, and each including a transmitting and a receiving gear loosely mounted respectively upon the main shaft and the driving-spindle, clutch mechanisms for locking either of said gears to the shaft or spindle upon which it is mounted, and shifting mechanism including a lever operatively connected with both clutch mechanisms for simultaneously locking the transmitting and receiving gears of either system, substantially as specified.

12. In a motor-propelled vehicle, the combination of a driving-spindle, a receiving-gear loosely mounted upon said spindle, operating devices for the receiving-gear, a clutch-rim carried by the receiving-gear, clutch-shoes carried by the spindle and yieldingly held out of contact with the clutch-rim, adjustable bearing-surfaces carried by said shoes, a movable collar, and means for actuating the same, and clutch-arms pivotally connected at their inner ends to said collar and arranged in terminal contact with the bearing-surfaces of the clutch-shoes, substantially as specified.

13. In a motor-propelled vehicle, the combination with a driving-spindle, a loose receiving-gear and means for rotating said gear, and a clutch-rim carried by the receiving-gear, expansible clutch-shoes carried by the spindle, adjustable wedge-blocks mounted upon the clutch-shoes, means for locking the wedge-block at the desired adjustment, clutch-arms having terminal bearing upon the wedge-block, and means for spreading the terminals of the clutch-arms, substantially as specified.

14. In a motor-propelled vehicle, the combination with a driving-spindle, a receiving-gear loosely mounted upon the spindle, and means for rotating the gear, of a clutch-rim carried by the gear, a supporting-bar fixed to the spindle, clutch-shoes pivotally mounted upon the supporting-bar and adapted to engage the inner surface of said clutch-rim, and yieldingly held out of contact therewith, clutch-arms provided at intermediate points with guide-pins fitted in cam-slots in the supporting-bar and adapted to bear at their outer extremities against the clutch-shoes, and means for actuating the clutch-arms to separate their outer extremities, substantially as specified.

15. In a motor-propelled vehicle, the combination with a main motor-actuated shaft, a driving-spindle, independent connections between the main shaft and the spindle, each connection including a transmitting-gear and a receiving-gear loosely mounted respectively upon the main shaft and the driving-spindle, clutch mechanism for locking the transmitting and receiving gears of either connection to the shaft and spindle, respectively, and including axially-movable collars, a clutch-shifting lever mounted for swinging movement in a plane parallel with said shaft and spindle and operatively connected with the collar of one of said clutches, a yoke connected with the collar of the other clutch, a rocker connected with the shifting-lever and having a cam, and a sliding pin connected with an arm on the spindle of said yoke and actuated by the cam of the rocker, substantially as specified.

16. The herein-described controlling-lever for independently actuating a plurality of mechanisms with which it is operatively connected, said lever having a member mounted for swinging movement in a plurality of intersecting planes, a second member mounted upon the first-named member, for reciprocatory movement, and an electric switch or cut-out carried by the lever, and having a connecting circuit-wire extending through a tubular portion of the lever to a point near its fulcrum, substantially as specified.

17. In a motor-propelled vehicle, the combination with clutch mechanism and steering mechanism, of a steering-arm mounted for swinging movement in a vertical plane and operatively connected with the steering mechanism, a controlling-lever mounted upon the steering-arm for swinging movement in a vertical plane perpendicular to that of the steering-arm, and operating connections between the controlling-lever and the clutch mechanism, substantially as specified.

18. In a motor-propelled vehicle, the combination with clutch mechanism and steering mechanism, of a steering-arm mounted for swinging movement in a vertical plane and operatively connected with the steering mechanism, a controlling-lever mounted upon the steering-arm for swinging movement in a vertical plane perpendicular to that of the steering-arm, operating connections between the controlling-lever and the clutch mechanism, and locking devices for securing the controlling-lever at the desired adjustment with relation to the steering-arm, substantially as specified.

19. In a motor-propelled vehicle, the combination with a driving-spindle, operating devices, clutch mechanism for connecting the operating devices with the driving-spindle, and steering mechanism including a pivotal cross-head, of a steering-arm mounted for longitudinal swinging movement and operatively connected with said cross-head, a controlling-lever pivotally mounted upon the steering-arm for transverse swinging movement, locking devices for temporarily securing the controlling-lever in any desired position with relation to the steering-arm, and a transversely-swinging shifting-lever connecting the controlling-lever with the clutch mechanism, substantially as specified.

20. In a motor-propelled vehicle, the combination with a driving-spindle, operating devices, clutch mechanism for connecting the operating devices with the driving-spindle, and steering mechanism including a pivotal cross-head, of a steering-arm mounted for longitudinal swinging movement and operatively connected with said cross-head, a controlling-lever pivotally mounted upon the steering-arm for transverse swinging movement, locking devices for temporarily securing the controlling-lever in any desired position with relation to the steering-arm, and a transversely-swinging shifting-lever of sectional construction having its body portion pivoted for lateral swinging movement and operatively connected with the clutch mechanism, and having a sliding section connected with the controlling-lever, substantially as specified.

21. In a motor-propelled vehicle, the combination with a driving-spindle, operating devices, clutch mechanism for connecting the operating devices with the driving-spindle, steering mechanism, and brake mechanism, of a controlling-lever, and operating connections between the lever and said steering, clutch, and brake mechanisms, substantially as specified.

22. In a motor-propelled vehicle, the combination with a driving-spindle, operating devices, clutch mechanism for connecting the operating devices with the driving-spindle, steering mechanism, and brake mechanism, of a controlling-lever mounted for swinging movement in a plurality of different planes, and having a sliding member, operating connections between the lever and said steering and clutch mechanisms, and operating connections between said sliding member of the controlling-lever and the brake mechanism, substantially as specified.

23. In a motor-propelled vehicle, the combination with a driving-spindle, operating devices, clutch mechanism for connecting the operating devices with the driving-spindle, steering mechanism, and brake mechanism, of a controlling-lever mounted for swinging movement in a plurality of different planes and having an axially-sliding member, operating connections between the controlling-lever and the steering mechanism, and shifting and brake levers mounted for swinging movement in different planes, and connected respectively to the body portion and the sliding member of the controlling-lever, substantially as specified.

24. In a motor-propelled vehicle, the combination with a driving-spindle, operating devices, clutch mechanism for connecting the operating devices with the driving-spindle, steering mechanism, and brake mechanism, of a controlling-lever having a stem mounted for swinging movement in longitudinal and transverse planes, and also have a sliding member mounted upon the stem, operating connections between the stem of the controlling-lever and the steering mechanism for actuation when said stem is swung in one of said planes, connections between the stem of the controlling-lever and the shifting mechanism for actuation when the controlling-lever is swung in the other of said planes, and a brake-lever connecting the shifting member of the controlling-lever with the brake mechanism, and mounted for swinging movement in a vertical plane, substantially as specified.

25. In a motor-propelled vehicle, the combination with a driving-spindle, operating devices, clutch mechanism for connecting the operating devices with the driving-spindle, steering mechanism, and brake mechanism, of a steering-arm mounted for swinging movement in a longitudinal plane and operatively connected with the steering mechanism, a controlling-lever having a stem pivotally connected to the steering-arm for swinging movement in a transverse plane, locking devices for securing the stem in the desired position with relation to the steering-arm, said controlling-lever also having a sliding grip-carrying member mounted upon the stem, means for securing the grip-carrying member in its normal position with relation to the stem, a transversely-swinging shifting-lever connecting the stem of the controlling-lever with the clutch mechanism, and a vertically-swinging brake-lever operatively connecting the grip-carrying member of the controlling-lever with the brake mechanism, substantially as specified.

26. In a motor-propelled vehicle, the combination with a driving-spindle, operating devices, clutch mechanism for connecting the operating devices with the driving-spindle, steering mechanism, and brake mechanism, of a steering-arm mounted for swinging movement in a longitudinal plane and operatively connected with the steering mechanism, a controlling-lever pivotally mounted upon the steering-arm for independent swinging movement in a transverse plane, said lever comprising a stem and an independent grip-carrying member mounted to slide upon the stem, locking devices for securing the stem at the desired position with relation to the steering-arm, a hand-lever arranged contiguous to the grip of the sliding member and operatively connected with said locking devices, a second locking device for securing the grip-carrying member in its normal position with relation to the stem, and including a hand-lever also located contiguous to said grip, and shifting and brake levers respectively mounted for swinging movement in transverse and vertical planes, and operatively connecting the stem and grip-carrying member of the controlling-lever respectively with the clutch and brake mechanisms, substantially as specified.

27. In a motor-propelled vehicle, the combination with a driving-spindle, operating devices, including a motor, clutch mechanism for connecting the operating devices with the driving-spindle, steering mechanism, and brake mechanism, of a controlling-lever, mounted for swinging movement in intersecting planes, having a member mounted to slide toward and from the fulcrum of the lever, and a switch mounted on the sliding member, and operating connections between the said switch and lever members, and said motor, clutch, steering, and brake members, substantially as specified.

28. In a motor-propelled vehicle, the combination with a driving-spindle, operating devices, including a motor, clutch mechanism for connecting the operating devices with the driving-spindle, steering mechanism, and brake mechanism, of a controlling-lever operatively connected by independent means respectively with said steering mechanism, clutch and brake mechanisms having a grip, provided with a switch, and connections between the switch members and the terminals of an electrical conductor arranged in circuit with means for shifting the motor in and out of gear, substantially as specified.

29. In a motor-propelled vehicle, the combination with a driving-spindle, operating devices, clutch mechanism for connecting the operating devices with the driving-spindle, and brake mechanism, of a controlling-lever having a swinging member and a sliding member mounted upon the swinging member, a shifting-lever operatively connecting the swinging member of the controlling-lever with the clutch mechanism, a rocker operatively connected with the shifting-lever for swinging movement therewith, a brake-lever mounted for swinging movement perpendicular to the plane of the shifting-lever and extending through an opening in the rocker, said brake-lever being connected with the sliding member of the controlling-lever, and a stationary guard arranged in the path of movement of the brake-lever and having a central space through which the brake-lever may be operated when the rocker is in its normal or intermediate position, substantially as specified.

30. In a motor-propelled vehicle, the combination with a driving-spindle, operating devices, clutch mechanism for connecting the operating devices with the driving-spindle, and brake mechanism, of a controlling-lever having a swinging member and a sliding member mounted for movement upon the swinging member, a transversely-swinging rocker having a bifurcated free end and carrying a guide-block for sliding movement in its bifurcation, a laterally-swinging shifting-lever connecting the swinging member of the controlling-lever with the clutch mechanism and extending through an opening in said guide-block, a vertically-swinging brake-lever operatively connecting the sliding member of the controlling-lever with the brake mechanism and extending through the bifurcation of the rocker, and a guard having oppositely-disposed arms partly spanning the bifurcation of the rocker in the path of the brake-lever, and terminally separated to form an interval in the plane of which the brake-lever is arranged when the rocker is in its normal position, substantially as specified.

31. In a motor-propelled vehicle, the combination with a driving-spindle, operating devices, clutch mechanism for connecting the operating devices with the driving-spindle, and brake mechanism, of a controlling-lever having a swinging member and a vertically-sliding member mounted upon the swinging member, a rocker mounted for transverse swinging movement and having a bifurcated free end, a guide-block mounted to slide in the bifurcation of the rocker, a transversely-swinging shifting-lever operatively connecting the swinging member of the controlling-lever with the clutch mechanism and extending through an opening in said guide-block, a vertically-swinging brake-lever operatively connecting the sliding member of the controlling-lever with the brake mechanism and extending through the bifurcation of the rocker, and a guard disposed contiguous to the plane of the rocker, having oppositely-disposed pivotally-connected rods terminating at their upper ends in inwardly-extending arms partly spanning the bifurcation of the rocker in the path of the brake-lever and separated to form an interval through which the brake-lever may be operated when the rocker occupies its normal position, and means for securing said pivotally-connected rods in the desired relative positions to vary the interval between their terminal arms, substantially as specified.

32. In a motor-propelled vehicle, a combined braking and backing mechanism having spaced driving and driven friction-pulleys, means for actuating the driving friction-pulley, a transmitting-pulley for contact with the surface of the driven pulley and yieldingly held out of contact therewith, a controlling-pulley of greater diameter than the interval between the driving-pulley and the transmitting-pulley and adapted to be moved into contact therewith to force the transmitting-pulley into contact with the driven pulley, and means for actuating the controlling-pulley, substantially as specified.

33. In a motor-propelled vehicle, a combined braking and backing mechanism having spaced driving and driven friction-pulleys, means for actuating the driving friction-pulley, a transmitting-pulley for contact with the surface of the driven pulley and yieldingly held out of contact therewith, swinging arms, and means for actuating the same, pivotal bearings supported by said arms and capable of swinging movement independently thereof, and a controlling friction-pulley of larger diameter than the interval between the driving and transmitting pulleys, and having its spindle mounted in said swinging bearings, whereby the controlling-pulley is adapted to be crowded between the peripheries of the driving and transmitting pulleys, substantially as specified.

34. In a motor-propelled vehicle, a combined braking and backing mechanism having spaced driving and driven friction-pulleys and means for actuating the driving-pulley, a movable transmitting-pulley adapted to be arranged in peripheral contact with the driving-pulley, sliding bearings for the spindle of the transmitting-pulley, springs for yieldingly holding the bearings of the transmitting-pulley disposed to maintain the transmitting-pulley out of contact with the driven pulley, a controlling-pulley movably mounted for interposition between and in contact with the driving and transmitting pulleys, and adapted to advance the transmitting-pulley against the tension of its return-springs into contact with the driven pulley, and means for moving the controlling-pulley, substantially as specified.

35. In a motor-propelled vehicle, a combined braking and backing mechanism having spaced driving and driven friction-pulleys and means for actuating the driving-pulley, a movable transmitting-pulley adapted to be arranged in peripheral contact with the driving-pulley, sliding bearings for the spindle of the transmitting-pulley, springs for yieldingly holding the bearings of the transmitting-pulley disposed to maintain the transmitting-pulley out of contact with the driven pulley, a controlling-pulley movably mounted for interposition between and in contact with the driving and transmitting pulleys, and adapted to advance the transmitting-pulley against the tension of its return-springs into contact with the driven pulley, and means for moving the controlling-pulley, the same including a rock-shaft having arms, adjustable connections between said arms and the supporting devices of the controlling-pulley, a brake-lever connected with the operating-lever, and connections between the brake-lever and said rock-shaft, substantially as specified.

In testimony that I claim the foregoing as my own I have hereto affixed my signature in the presence of two witnesses.

JOHN L. GLAZIER.

Witnesses:
CHARLES L. GLAZIER,
F. R. LINDLEY.